May 26, 1970      W. P. STEVENS      3,513,953
BRAKE AND MOTOR CONTROL FOR ELECTRIC VEHICLE
Filed June 20, 1968
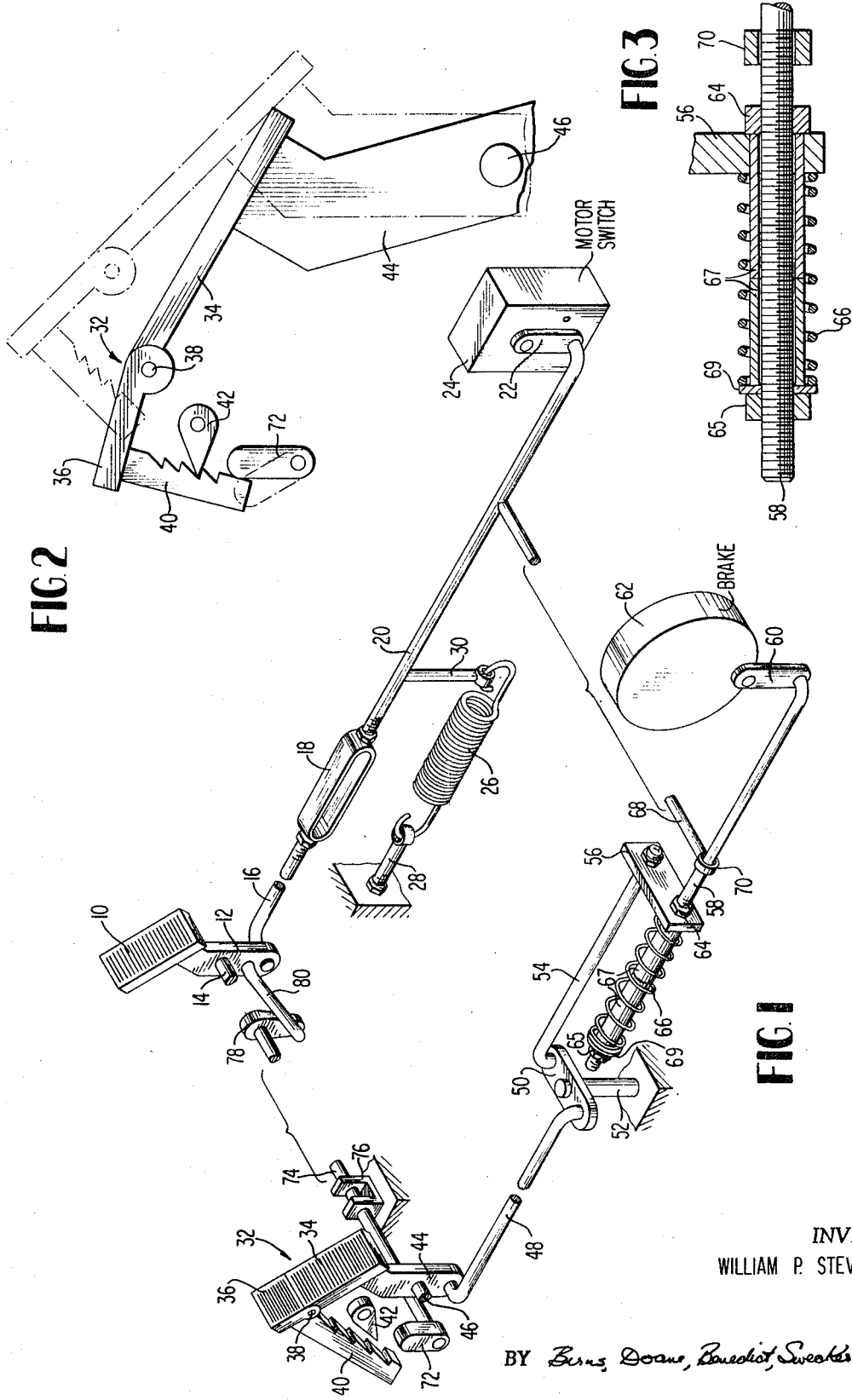
INVENTOR
WILLIAM P. STEVENS
BY *Burns, Doane, Benedict, Swecker & Mathis*
ATTORNEY

United States Patent Office 3,513,953
Patented May 26, 1970

3,513,953
BRAKE AND MOTOR CONTROL FOR ELECTRIC VEHICLE
William P. Stevens, Augusta, Ga., assignor to Stevens Appliance Truck Company, Augusta, Ga., a corporation of Georgia
Filed June 20, 1968, Ser. No. 738,481
Int. Cl. H02k 7/10
U.S. Cl. 192—2                                          9 Claims

ABSTRACT OF THE DISCLOSURE

A brake and accelerator assembly for a vehicle driven by a switch controlled electric motor which provides both automatic and independent brake actuation. An accelerator pedal controls the opening and closing of the motor controlling switch through appropriate linkage. The linkage is biased to open the switch and apply the brake automatically. The biasing means is adjustable, however, to allow only partial braking. An engaging means which cooperates with the biasing means to apply the brake automatically is adjustable to provide variable lost motion control, and to render the automatic braking completely inoperable. Thus, when the acceleration pedal is released, the vehicle accelerator pedal linkage may be adjusted either for "free wheeling" or automatic brake operation. A brake pedal on the vehicle provides independent braking actuation. The brake pedal has an upper pivotable section on which is mounted a brake locking ratchet member that is in position to engage a pawl on the chassis when the pedal section is pivoted. The brake locking member is automatically released by movement of the accelerator pedal.

BACKGROUND OF THE INVENTION

The present invention relates to slow speed vehicles. More specifically, it is directed to an accelerator and brake assembly for an electrically driven vehicle.

Slow speed vehicles have primarily been used as motorized golf cars. In previous vehicles, various brake and accelerator assemblies have been used. One assembly which has been suggested consists of a single foot pedal which upon operation by pivotal movement causes the vehicle brake to be released and the motor to be switched on through a single series of connecting levers. Upon release of the pedal, biasing means attached to the connecting levers urges the assembly to return to its rest position thereby applying the brake and turning the motor off. Modifications of this assembly have included a lost motion connection to the brake so that braking action is initiated only after the foot pedal returns to a predetermined position from its motor actuating position.

These prior assemblies, however, are not adaptable to varying conditions of operation, because the coordination of motor and brake operation is not adjustable so as to provide fully automatic braking, or independent braking, or only partial automatic braking. Furthermore, such systems have not allowed the vehicle to be rendered completely free wheeling, since in such solely automatic systems, the brake will be actuated every time the accelerator is released. Free wheeling may be especially desirable if the vehicle is not being utilized in a manner requiring frequent stops.

Additionally, in assemblies having independent brake and accelerator pedals the inclusion of a brake locking means has been suggested. One such locking means consists of a spring biased member which holds the brake in an actuated position until released by operation of the accelerator pedal. This locking means, however, is not selectively operable but is operated whenever the brake pedal is fully depressed. This automatic brake locking is not always desired when the brake pedal is fully depressed and may create a dangerous situation by requiring acceleration of the vehicle to release it.

In recognition of the problems and disadvantages of known assemblies, it is a general object of the present invention to provide a brake and accelerator assembly which obviates or minimizes these problems and disadvantages.

A specific object of the present invention is to provide a brake and accelerator assembly which is capable of both automatic and independent brake operation.

Another object of the present invention is to provide a brake and accelerator assembly in which the automatic brake applying arrangement is adjustable.

Yet another object of the present invention is to provide a brake and accelerator assembly in which the automatic brake applying arrangement can be rendered completely inoperable.

Still another object of the present invention is to provide a brake and accelerator assembly which includes an independent brake lock.

SUMMARY OF THE INVENTION

These objects are accomplished in accordance with a preferred embodiment of the invention by providing a brake and accelerator assembly for a switch controlled electric motor which includes an accelerator pedal operatively connected through linkage rods to the motor controlling switch, and a brake pedal operatively connected through linkage rods to a brake. A brake applying bar extending from the accelerator linkage rod is in position to engage a nut on the brake linkage rod upon release of the spring biased accelerator pedal rod. The nut may be positioned so as to render the brake applying bar inoperable.

Additionally, the spring biasing means provided on the accelerator linkage to urge the accelerator pedal to its rest position thereby returning the motor controlling switch to its off position, is adjustable so that the brake applying bar may cause only partial braking.

Still further, the brake pedal is provided with an independently operable brake locking means which includes a ratchet member extending from an upper pivotal section of the brake pedal. This member engages a pawl when thte upper section is pivoted relative to the brake pedal. A release cam carried by the accelerator pedal disengages the ratchet member when the accelerator pedal is depressed.

THE DRAWING

This preferred embodiment is illustrated in the accompanying drawing in which:

FIG. 1 is a perspective view, partially schematic, of the accelerator and brake system;

FIG. 2 is an enlarged view of the articulated brake pedal and locking means; and FIG. 3 is an enlarged view of the brake actuating arrangement.

DETAIL DESCRIPTION OF THE PREFERRED EMBODIMENT

Referring to FIG. 1, an accelerator pedal 10 is secured on the upper end of a vertically extending lever 12 which is pivotally mounted on the vehicle frame for swinging movement on a horizontally extending shaft 14. Pivotally connected to the lower portion of the lever 12 is a rod 16 which is connected by means of a turnbuckle 18 to a second rod 20. The end of the rod 20 is pivotally connected to a motor switch lever 22. This lever 22 actuates a motor controlling switch 24 to control the supply of electric power to the vehicle driving motor (not shown).

The switch 24 may be closed to supply electric current to the motor by forward pivotal movement of the accelerator pedal 10 (counterclockwise, as shown). This movement of the pedal 10 displaces the rods 16 and 20 rearwardly to swing the lever 22 rearwardly thereby closing the motor switch 24. The rods 16 and 20 and accelerator pedal 10 are biased to return the switch 24 to an open position by a spring 26 which is tensionally held between an adjustable support 28 mounted on the vehicle and a support 30 carried on the rod 20.

A brake pedal 32 includes a lower section 34 and an upper section 36 pivotally connected to the lower section 34 by a hinge 38. The upper section 36 is preferably urged toward alignment with the lower section 34 as shown in phantom lines in FIG. 2 by a spring at the hinge 38. A ratchet member 40 extends downward from the upper section 36 substantially normal thereto. A pawl 42 is fixedly mounted on the vehicle adjacent to the ratchet member in position to be engaged by the ratchet member 40 to lock the brake pedal in an actuated position when the upper section 36 is pivoted relative to the lower section 34, as shown in full lines in FIG. 2.

The lower section 34 of the brake pedal 32 is secured on the upper end of a vertically extending lever 44 which is pivotally mounted on the vehicle frame for swinging movement on a horizontally extending shaft 46.

The lower portion of the lever 44 is pivotally connected to one end of a rod 48. A motion reversing arm 50 is mounted for swinging movement on a shaft 52 which is mounted on the vehicle. The opposite end of the rod 48 is attached to one end of the reversing arm 50. The other end of the reversing arm 50 is pivotally connected to one end of a rod 54. The opposite end of the rod 54 is secured to an adjustable plate 56 by a nut. The adjustable plate 56 has an opening through which a brake rod 58 extends. One end of the brake rod 58 is connected to a brake actuating lever 60 which operates a wheel brake 62. The brake 62 may be any conventional type of wheel brake which is actuated by pivotal movement of a lever arm and is spring biased to return the lever arm to a non-actuated position.

Referring to FIG. 3, the adjustable plate 56 is positioned about the rod 58. A nut 64 is threadably engaged on the rod 58 on the side of the plate 56 facing the brake lever 60. The end of the brake rod is threaded to accommodate the nut 64 and a spring retaining nut 65. A cushioning spring 66 is assembled on the rod 58 between a washer 69, disposed on the rod 58 next to the nut 65, and the plate 56. A pair of bushings 67 are provided in the center of the spring 66 between the nut 64 and washer 69. The plate 56 is positioned about and slides along the bushings 67.

Referring again to FIG. 1, the brake 62 may be actuated by forward pivotal movement of the brake pedal 32 (counterclockwise as shown), to displace the rod 48 rearwardly. This rearward movement of rod 48 is transmitted by the reversing arm 50 to displace the rod 54 and adjustable plate 56 forwardly. Forward movement of plate 56 acts through cushioning spring 66 to displace the rod 58 forwardly to swing the brake lever 60 forwardly thereby applying the brake 62 to stop the vehicle. The biasing springs in the brake 62 and the cushioning spring 66 act to return the brake assembly to its non-actuated position upon release of the brake pedal 32.

Automatic braking of the vehicle may be provided by a brake applying bar 68 which extends horizontally from and transversely to the axial direction of the rod 20. The bar 68 is provided with a loop 70 which slidably engages the brake rod 58 between the adjustable plate 56 and the brake lever 60. The bar 68 is sufficiently rigid and short enough axially to transmit, without bending, braking force from the rod 20 to the nut 64. When the rod 20 is moved forward by the action of the spring 26, the bar 68 engages the nut 64 to urge the brake rod 58 forwardly, thereby applying the brake 62.

When the brake pedal 32 is locked by the pawl, movement of the accelerator pedal releases the brake pedal. Means to disengage the ratchet member 40 automatically from the pawl 42 upon counterclockwise movement of the accelerator pedal is provided by a cam 72 adjacent the lower end of the ratchet member 40. The cam 72 is fixedly attached to one end of a transversely extending rod 74 which is supported on the vehicle by a yoke 76. The other end of the rod 74 is fixedly attached to a lever 78 which is coupled to the lever 12 by a link 80. Forward pivotal movement of the accelerator pedal causes the lever 78 to rotate thereby rotating the rod 74 and cam 72 to disengage the ratchet member 40 from the pawl, as shown in FIG. 2.

In operation, assuming the ratchet member 40 is engaged by the pawl 42 to hold the brake pedal 32 in an actuated position, forward pivotal movement of the accelerator pedal 10 rotates the cam 72 by means of the rod 74, the link 80 and the lever 78 to disengage the ratchet member thereby allowing the brake pedal and the brake 62 to return to non-actuated positions. This forward pivotal movement of the accelerator pedal also displaces rods 16 and 20 rearwardly to swing the switch lever 22 rearwardly thereby closing the switch 24 to supply power to the vehicle driving motor.

Upon release of the accelerator pedal, the biasing spring 26 will urge the rods 16 and 20 forwardly to swing the lever 22 forwardly thereby opening the switch 24. Forward movement of the rod 20 also causes the brake applying bar 68 to move forward against the nut 64 to urge it forward. This forward movement of the nut 64 acts to move the brake rod 58 forwardly to swing the brake lever 60 forwardly thereby applying the brake 62. The upper portion 36 of the brake pedal may be depressed to engage the pawl 42 with the ratchet member 40.

The operation of the system may be varied to produce partial braking or independent braking by the brake pedal. The spring support 28 is adjustably mounted to vary the tension of the spring 26, thereby varying the return forward movement of the rod 20. This adjustability may be used to vary the automatic braking through brake applying bar 68 so that only partial braking will occur automatically.

Furthermore, the position of nut 64 on the rod 58 may be varied to provide variable lost motion control. Further, it may be used to render the automatic braking completely inoperable by positioning the nut 64 sufficiently forward to prevent abutment by the brake applying bar 68.

The brake 62 may also be actuated independently by forward pivotal movement of the brake pedal 32 to displace the rod 48 rearwardly. The direction of this movement is reversed by the reversing arm 50 to displace the rod 54 and the plate 56 forward. This forward movement of the plate 56 acts through cushioning spring 66 to displace the brake rod 58 forwardly to swing the lever 60 forwardly thereby actuating the brake. Additionally, the brake may be locked in an actuating position by depressing the upper portion 36 of the brake pedal to engage the pawl 42 with the ratchet member 40.

Summarizing, the present invention provides a brake and accelerator assembly for a switch controlled motor driven vehicle which allows both automatic and independent brake actuation. The automatic braking action caused when the accelerator pedal is moved to open the switch may be adjusted so as to provide only partial braking. Furthermore, the automatic braking action may be adjusted to provide a predetermined lost motion control or may be rendered completely inoperable.

In addition, a brake locking means is provided to maintain the brake in an actuated state. This brake locking means may be selectively engaged and is automatically released upon operation of the accelerator pedal.

I claim:
1. A brake and accelerator assembly for a vehicle driven by a switch controlled electric motor comprising:
  first pedal means, first linkage means connecting said first pedal means with said switch, said first pedal means being movable to open and close said switch to control the energization of said motor, biasing means connected to said first linkage means for urging said first pedal means to open said switch, brake means, second pedal means, second linkage means connecting said second pedal means with said brake means, said second pedal means being movable independently of said first pedal means to actuate said brake means, said first linkage means being movable independently of said second linkage means to close said switch, and brake applying means carried by said first linkage means operatively engageable with said second linkage means said biasing means operating said linkage means to apply said brake means when said first pedal means moves to open said switch.

2. A brake and accelerator assembly according to claim 1 wherein said biasing means is adjustable so as to render said brake applying means only partially operable.

3. A brake and accelerator assembly according to claim 1 wherein said biasing means comprises an adjustably tensioned spring member.

4. A brake and accelerator assembly according to claim 1 wherein said second linkage means includes means for engaging said brake applying means, said engaging means being adjustable so as to provide variable lost motion and to render said brake applying means inoperable.

5. A brake and accelerator assembly according to claim 4 wherein said brake applying means comprises a rod extending from said first linkage means and having a loop slidably engaging said second linkage means, and said engaging means comprises an adjustably positioned nut carried by said second linkage means.

6. A brake and accelerator assembly according to claim 1 further comprising brake locking means connected to said second pedal means for holding said brake means in an actuated position, and releasing means connected to said first pedal means for releasing said brake locking means when said first pedal means is operated.

7. A brake and accelerator assembly according to claim 6 wherein said brake locking means includes an upper pivoted section on said second pedal means having a ratchet member connected thereto, and pawl means for engaging said ratchet member.

8. A brake and accelerator assembly according to claim 7 wherein said releasing means connected to said first pedal means comprises a pivotable rod extending toward said brake pedal, said rod having a cam on its end nearest said second pedal means adapted to disengage said ratchet member from said pawl means when said first pedal means is operated.

9. A brake and accelerator assembly for an electrically driven vehicle comprising:

an accelerator pedal operatively connected to control an electric motor, brake means, a brake pedal operatively connected to actuate said brake means, said brake pedal including an upper pivoted section, a ratchet member extending from said upper pivoted section, pawl means for engaging said ratchet member, releasing means connected to said accelerator pedal for disengaging said ratchet member from said pawl means when said accelerator pedal is operated, said releasing means including a rod pivotally connected to said accelerator pedal and extending towards said ratchet member, and a cam connected to the end of said rod nearest said ratchet member and adapted to disengage said member from said pawl means upon operation of the accelerator pedal.

References Cited
UNITED STATES PATENTS

| 1,681,224 | 8/1928 | Du Pont. | |
| 2,816,633 | 12/1957 | Schumann | 192—2 |
| 2,839,168 | 6/1958 | Cosper | 192—2 |
| 3,229,792 | 1/1966 | Hock. | |

BENJAMIN W. WYCHE III, Primary Examiner

U.S. Cl. X.R.

192—3; 74—541; 310—77